US006285319B1

(12) United States Patent
Rose

(10) Patent No.: US 6,285,319 B1
(45) Date of Patent: Sep. 4, 2001

(54) METHOD FOR REDUCING GEOMETRICAL DILUTION OF PRECISION IN GEOLOCATION OF EMITTERS USING PHASE CIRCLES

(75) Inventor: Conrad Rose, King George, VA (US)

(73) Assignee: Litton Systems, Inc., Woodland Hills, CA (US)

(*) Notice: Subject to any disclaimer, the term of this patent is extended or adjusted under 35 U.S.C. 154(b) by 0 days.

(21) Appl. No.: 09/492,155

(22) Filed: Jan. 27, 2000

(51) Int. Cl.[7] .................................................. G01S 5/04
(52) U.S. Cl. ...................................... 342/449; 342/451
(58) Field of Search .................................. 342/424, 430, 342/449, 451

(56) References Cited

U.S. PATENT DOCUMENTS

| 3,922,533 | 11/1975 | Royal . | |
|---|---|---|---|
| 4,734,702 | 3/1988 | Kaplan | 342/424 |
| 5,343,212 | 8/1994 | Rose et al. | 342/424 |
| 5,526,001 | 6/1996 | Rose et al. | 342/424 |
| 5,652,590 | * 7/1997 | Deaton | 342/424 |
| 5,835,060 | * 11/1998 | Czarnecki et al. | 342/442 |
| 5,914,687 | 6/1999 | Rose | 342/442 |

OTHER PUBLICATIONS

Oshman, Y. et al, "Optimization of Observer Trajectories for Bearings–Only Localization", IEEE Trans. on Aerospace and Electronics Systems, Jul. 1999, pp. 892–902.*

Koteswara Rao, S. "Comments on 'Discrete–Time Observability and estimability Analysis for Bearings–Only Target Motion Analysis'", IEEE Trans. on Aerospace and Electronics Systems, Oct. 1998, pp. 1361–1367.*

Yaowei, Xu et al, "Passive Location of Fixed Emitter Using Additional Navigation Information", Proc. of the IEEE 1997 National Aerospace and Electronics Conf., Jul. 1997, pp. 1034–1038.*

G.P. Clark, "Simplified Determination of the Ellipse of Uncertainty", Journal of The Institute of Navigation, vol. 21, No. 4, Winter 1974–75, pp. 343–350.

* cited by examiner

Primary Examiner—Gregory C. Issing
(74) Attorney, Agent, or Firm—Lowe Hauptman Gilman & Berner, LLP

(57) ABSTRACT

The present invention determines the geolocation of an emitter, using at least one observer measuring signal change while moving on at least two observation tracks. The measurement of emitter signal change is begun between a first observer position and a second observer position. The second observer position is predicted at the time the last measurement from which signal change will be derived is made. The method utilizes knowledge of the measurement start and end points to determine a second pair of observer signal-change measurement start and end positions such that the emitter line-of-position (LOP) determined by the second signal change measurement will intersect the LOP associated with the first signal change measurement at possibly multiple points, but at each of these point intercept orthogonally to within the signal change measurement errors. The method determines the intersection points of the LOPs and assigns a likelihood to each intersection point for measuring the probability for each of the multiple intersection points that it is the emitter location, determines a correct emitter position from these likelihood weights, and generates an error associated with the emitter position estimate.

28 Claims, 13 Drawing Sheets

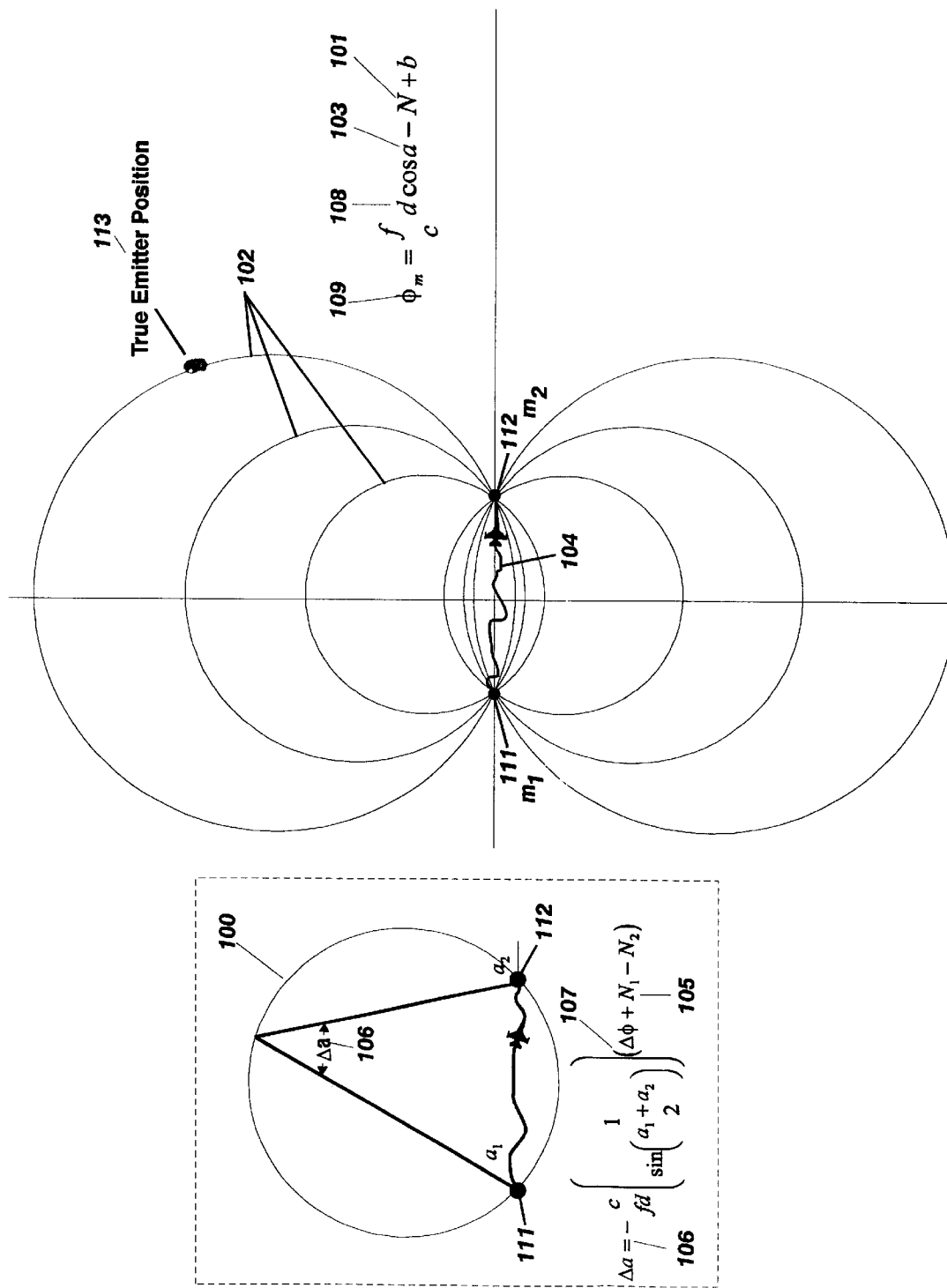
*Figure 1. φ - circles generated from ambiguous LBI all pass through two fixed points, 111 and 112. Each circle corresponds to a different integer value $N_1$-$N_2$.*

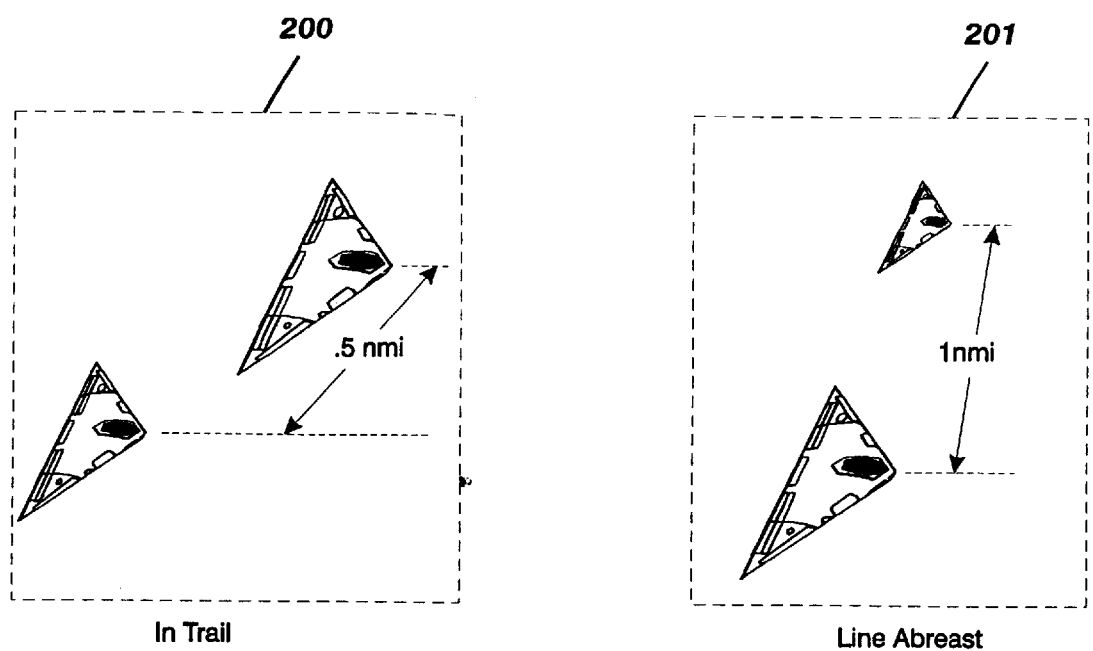
Figure 2. Common tactical formations

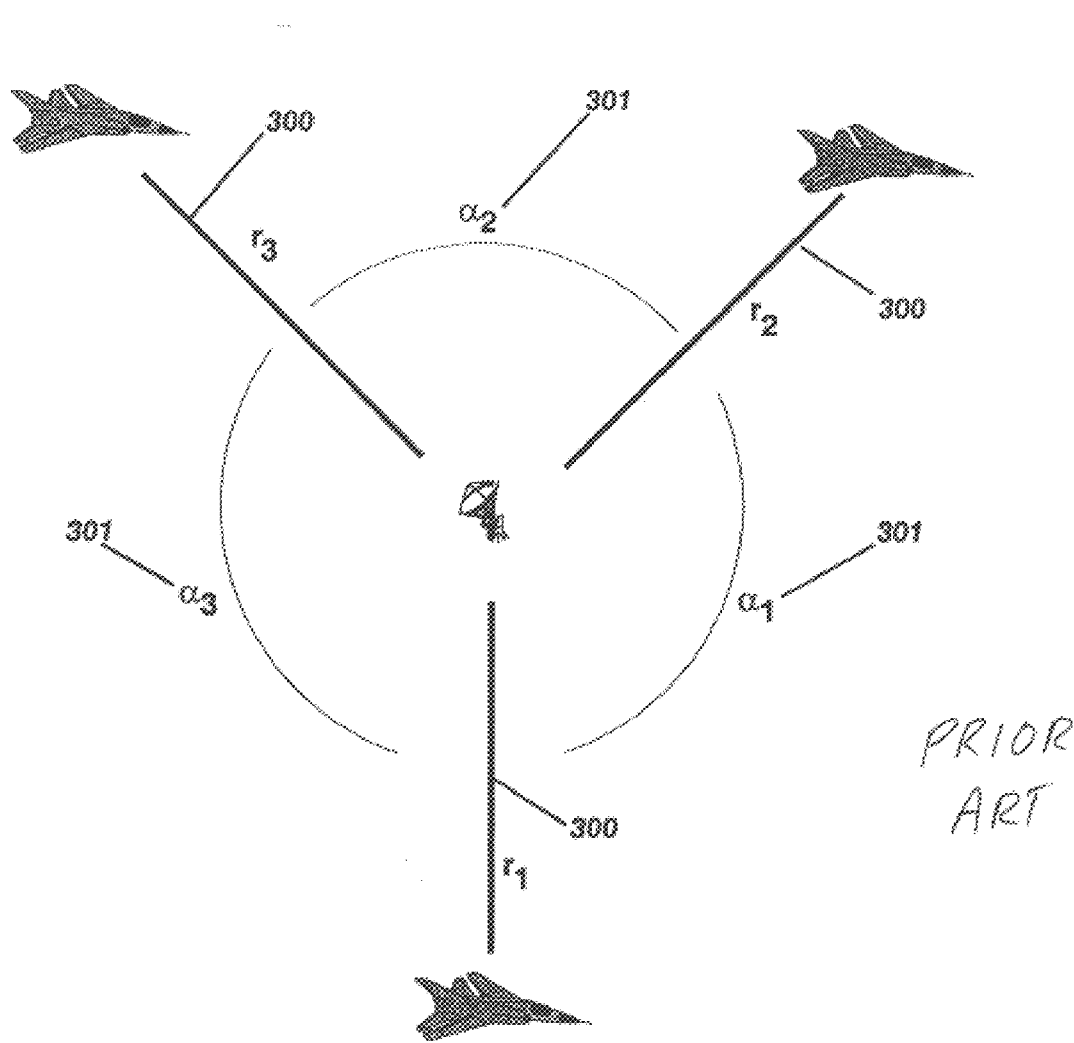
*Figure 3. Optimal TDOA geometry. Aircraft are widely separate on vertices of a triangle with the emitter at the center*

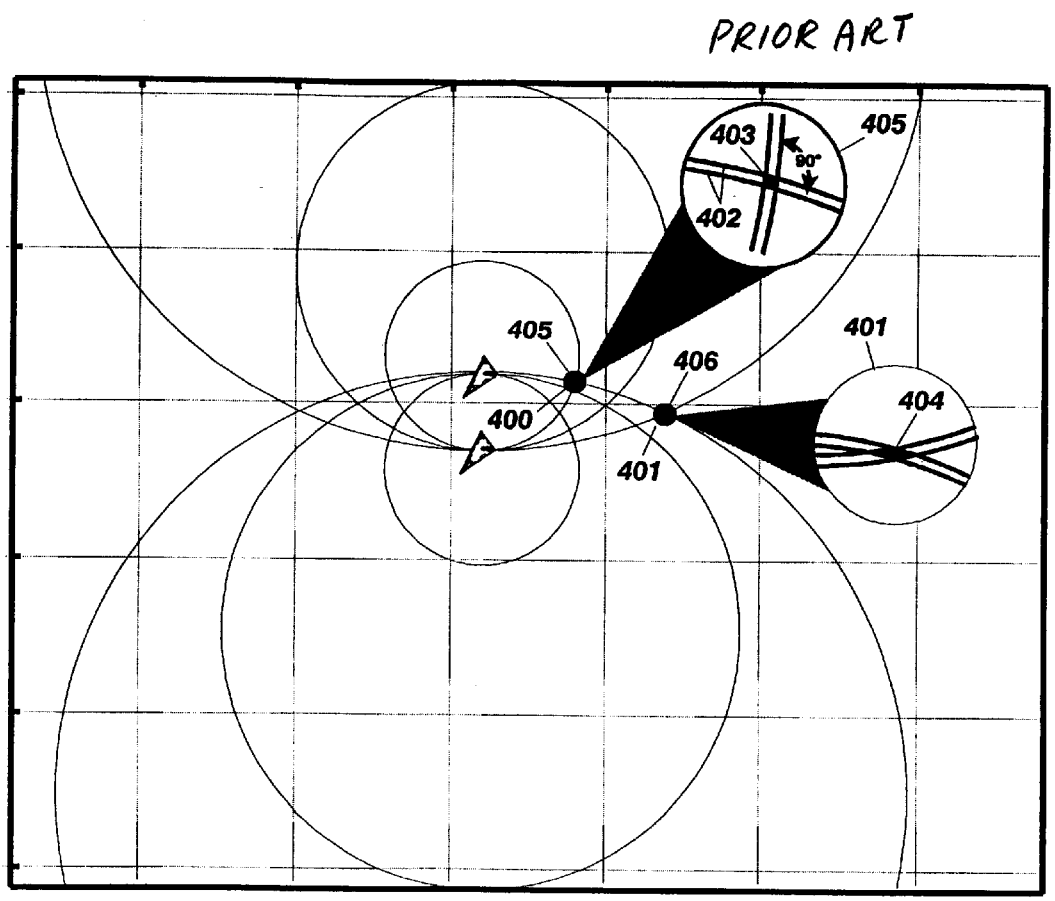
*Figure 4a. Conventional COP location with two aircraft in line abreast formation 201*

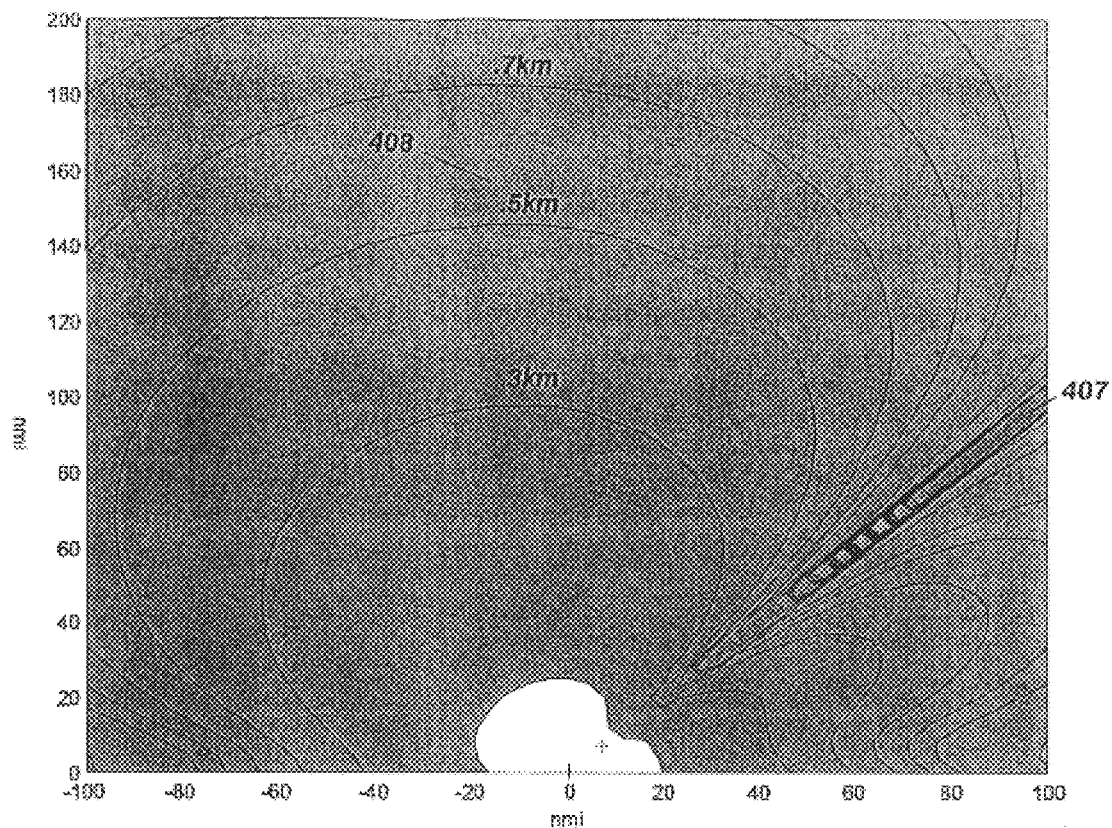
*Figure 4b. Constant error contours for case (4a). Performance is highly irregular as a function of emitter range and relative bearing, so acceptable results, as with TDOA, require some approximate prior knowledge of the emitter location.*

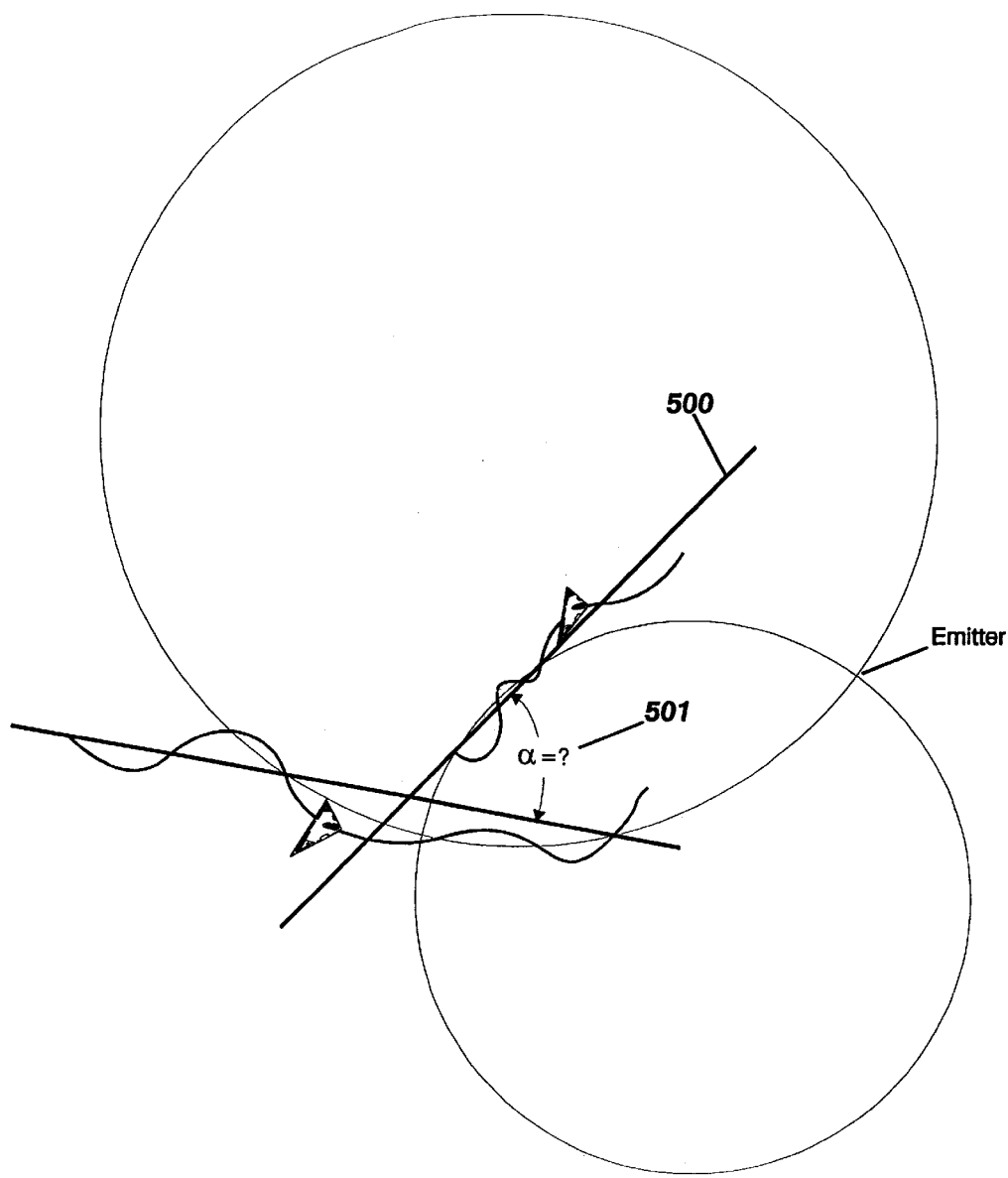
*Figure 5. Changing data collection paths can improve GDOP in some regions. This invention addresses the question: Is there a "best" angle α to improve GDOP everywhere?"*

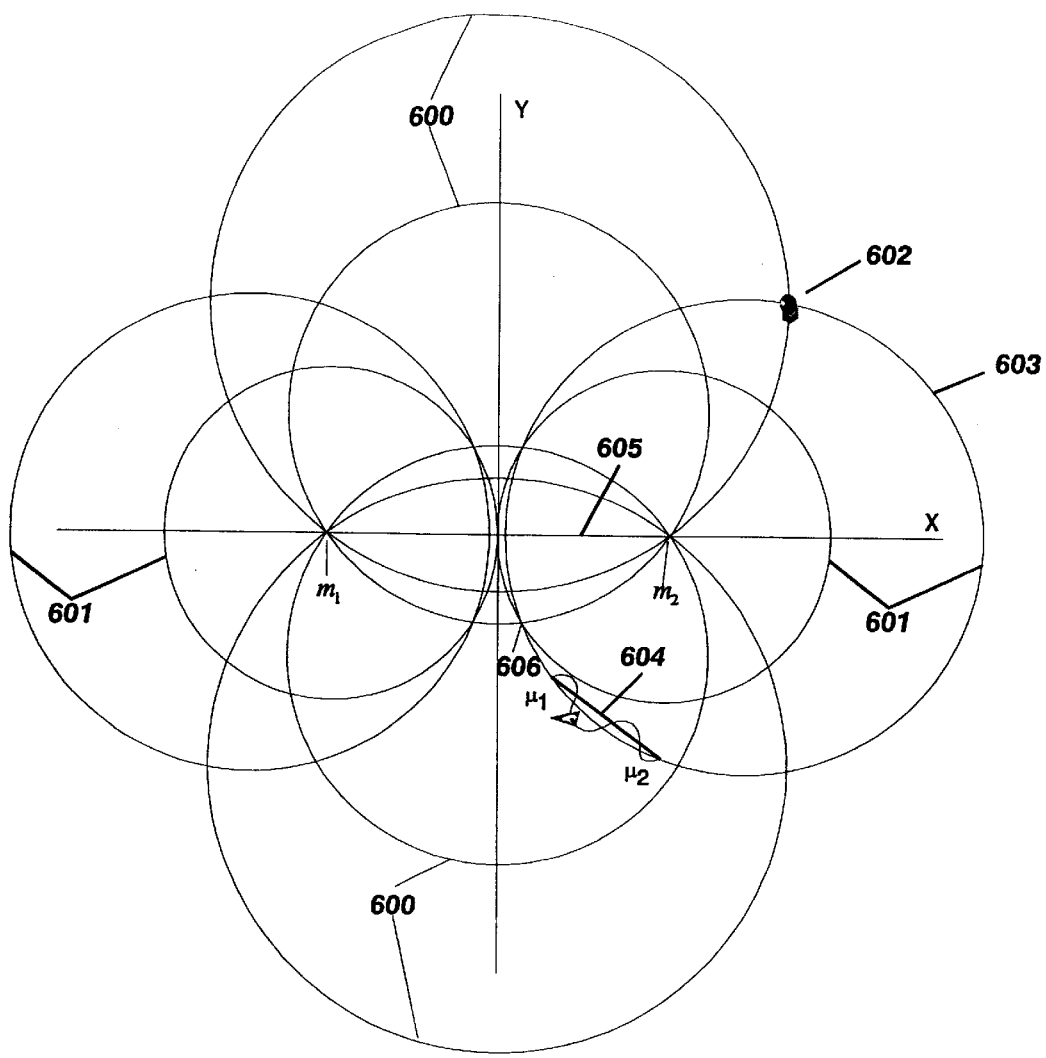

*Figure 6. Theoretical solution to the COP orthogonal intercept problem shows no fixed points exist analogous to $m_1$ and $m_2$ for the second family of circles 601. Hence the problem posed in Figure 5 cannot be rigorously solved. Instead means must be found to implement a physically realizable solution that closely approximates the results of the theoretical solution.*

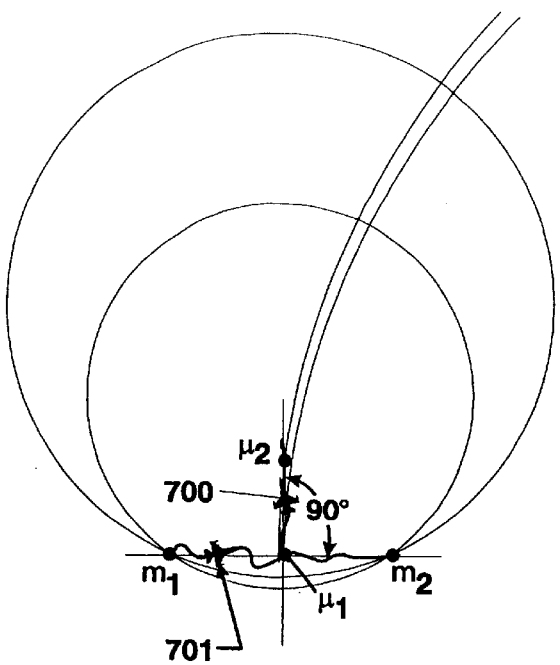

Figure 7a. The optimal average relative heading difference for closely spaced observers is 90° during data collection. With this relative heading difference all COP intersect everywhere at nearly right angles. This means that GDOP is minimum no matter where the emitter is located, and that the method can be used with either an ambiguous or fully resolved interferometer.

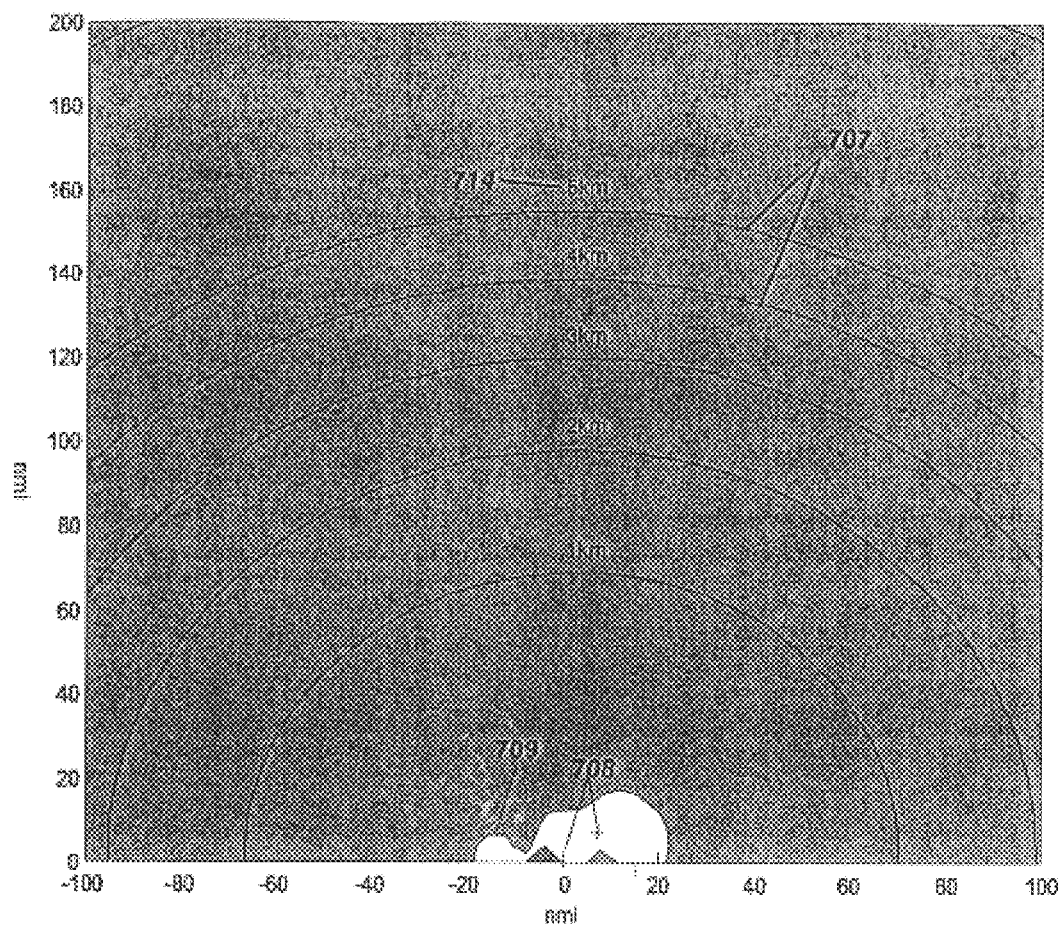
*Figure 7b. The results here should be contrasted with those in Figure 4b. Same scenario as Figure 4b with but with optimum headings and data collection geometry shown in Figure 7a.*

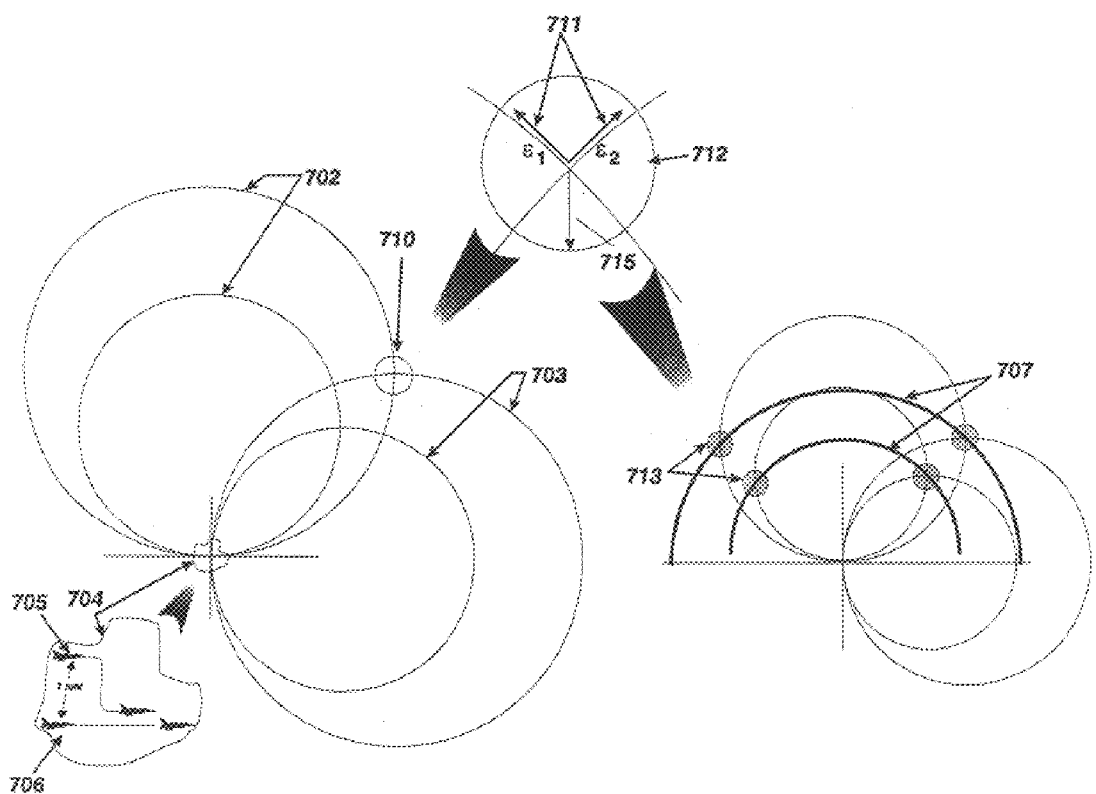
Figure 7c. The optimum choice of α in Figure 5, as shown in Figure 7a, results in circular error ellipses 712, (equivalently 710 and 713) and contours of constant location error 707 that are also nearly circles with center at the observers.

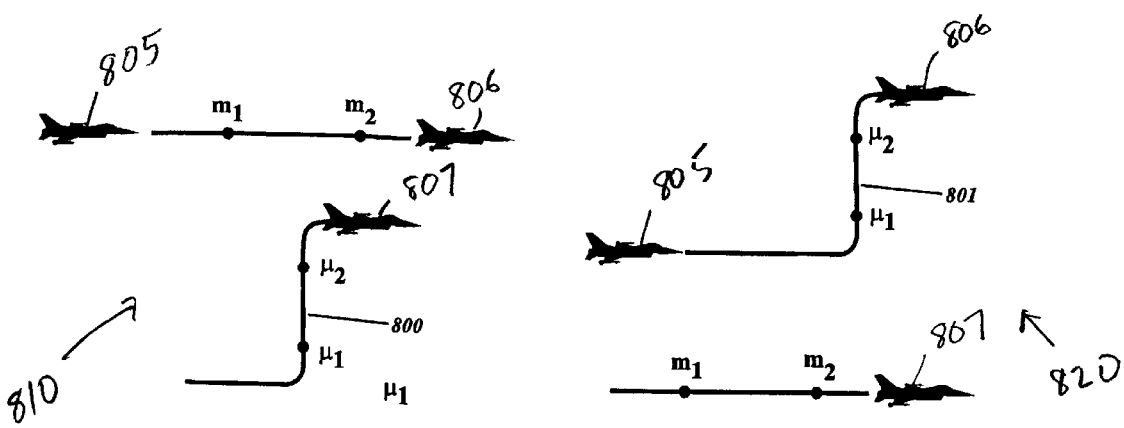
Figure 8. Illustrates how transitions between tactical formations are used to implement the optimum data collection geometry

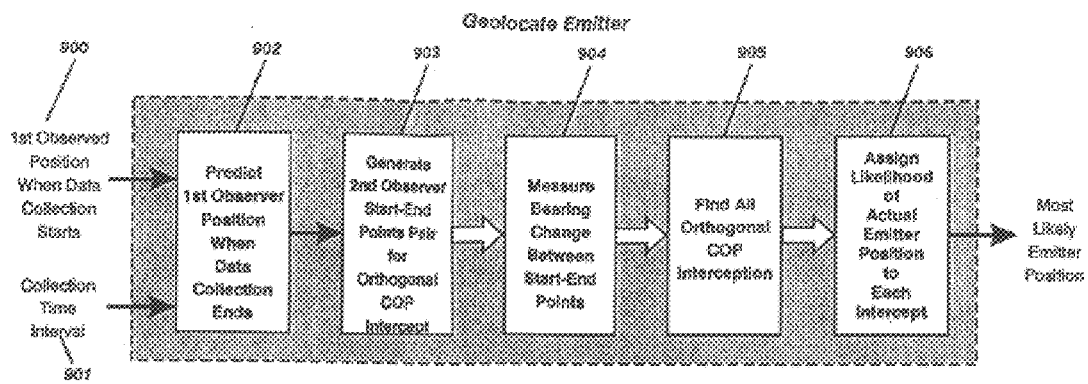

Figure 9a. The preferred method of this invention requires no knowledge of emitter location to produce optimal geolocation performance utilizing multiplatform lines-of-position. It requires only the data measurement positions of the first observer.

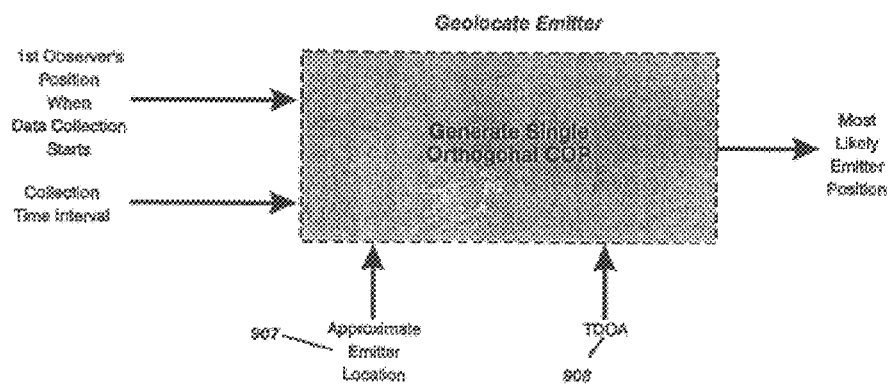

Figure 9b. The preferred method of the invention shown in Figure 9a uses closely spaced observers both to locate the emitter with minimum GDOP determine which of the multiple intercepts is the true position; if the observers can't be closely spaced, an additional input 907 is required and only a single orthogonal intercept can be guaranteed. The TDOA input 908 is optional, and is used to determine which LOP intercept is correct.

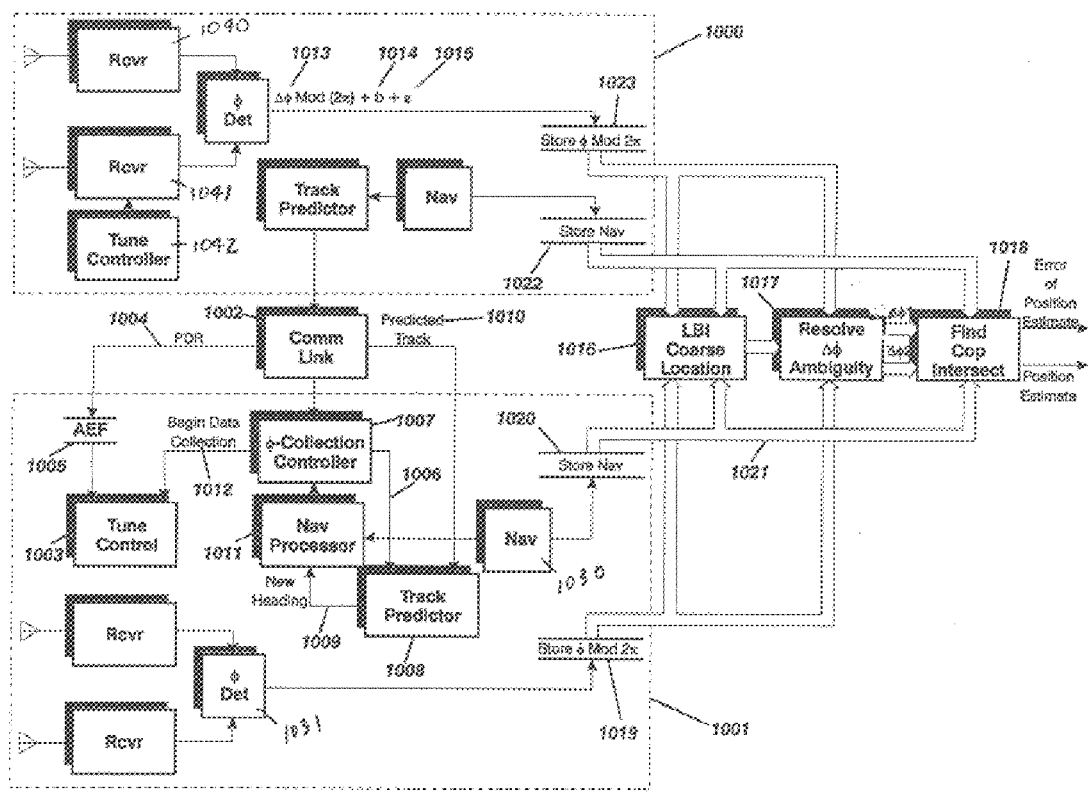
Figure 10. Preferred implementation is with two channel receivers and two aircraft. The data link between the aircraft requires no more bandwidth than a voice communication link.

METHOD FOR REDUCING GEOMETRICAL DILUTION OF PRECISION IN GEOLOCATION OF EMITTERS USING PHASE CIRCLES

FIELD OF THE INVENTION

The present invention relates generally to a method of geolocating an emitter, and more particularly, to the use of observer motion and observer heading change to reduce the error in geolocating an emitter when associating bearing differences with circles passing through both the observer and the emitter.

BACKGROUND OF THE INVENTION

The association of circular lines-of-position with horizontal bearing differences is a technique well known in navigation (see, for example, G. P. Clark, "Simplified Determination of the Ellipse of Uncertainty", Navigation: Journal of the Institute of Navigation, Vol. 21, No. 4, 1974). Royal, in U.S. Pat. No. 3,922,533 describes its use in multi-platform RF emitter location. In U.S. Pat. No. 5,526,001, the instant inventor presented a method to generate the circles employing phase difference measurements from a two antenna, uncalibrated, long-baseline-interferometer (LBI). When deriving the bearing difference from LBI phase differences, measurement precision is proportional to the interferometer baseline length, and inversely proportional to the emitter's frequency. Since the circular lines-of-position are generated from LBI phase measurements they are called phase circles.

FIG. 1 illustrates the unambiguous phase circles generated for arbitrary emitter locations relative to the observer. Because the LBI baseline d 108 (FIG. 1) is typically hundreds of wavelengths long, the phase measurements 109 give extremely high spatial angle resolution 103, but are highly ambiguous. The phase difference 107 measured between points 111 $m_1$ and 112 $m_2$ is associated with the phase circle 100 through the angle change measurement 106. But a consequence of the ambiguities 101 on the individual phase measurements is that the angle difference 106 is also ambiguous 105, and hence a family of phases circles 102 results. Each member of this family passes through the fixed points $m_1$ and $m_2$ marking the beginning and end of the phase change measurement. The track 104 the observer flies between these two points is arbitrary, and does not directly affect the generation of the family of phase circles. To obtain the emitter location a second set of phase circles must intercept this first family, and also the phase ambiguities must be correctly resolved. A second observer typically generates the second set of phase circles.

Note that FIG. 1 alternatively illustrates, for unambiguous phase measurements, the phase circles generated for arbitrary emitter locations relative to the observer. That is, for all specific ambiguity integers possible for all emitter locations, it illustrates the resulting phase circles through the emitters. Both interpretations of the figure are important for understanding the improvements introduced by the present invention because ambiguous phase circle interpretation is germane to one of the key features of the invention: optimal performance independent of the eventual ambiguity resolution process, i.e., independent of the actual values of 105 $N_1$–$N_2$ corresponding to the emitter position 113.

In generating the second family of possible COP, the only information available is the start position (111 FIG. 1) and predicted end point 112 of the observer making the initial; emitter detection.

SUMMARY OF THE INVENTION

It is, therefore, an object of the present invention to provide a method and apparatus for determining emitter location independent of the eventual phase ambiguity resolution process.

A further object of the present invention is to provide optimal performance in the resolution of emitter location, independent of emitter relative bearing and range.

Yet a further object of the present invention is to provide a method of determining emitter location that is independent of the ambiguity resolution process and independent of emitter relative bearing and range.

It is another object of the present invention to implement an approximation to an exact solution that has the desired property of forming two sets of circles from bearing difference measurements, these two sets intersecting everywhere at nearly right angles for any operationally significant emitter location.

Therefore, it is a further object of the present invention to determine the second data collection track that must be flown to generate the second family of circles, intersecting all members of the first family orthogonally, utilizing only knowledge of the start and end points of the first data collection.

It is yet another object of the present invention to employ transitions between common tactical formations when implementing a second data collection track.

Still another object of the present invention is to require only short data collection intervals, typically ten seconds or less, when generating the COP families.

It is also an object of the present invention that the COP intersect nearly orthogonally at the emitter, no matter what the initial emitter relative bearing, for every range beyond a certain minimum range from the observers.

Another object of the present invention is to provide a method for best approximating the theoretical solution so that the approximation most closely solves These and other objects of the present invention are achieved by a method for determining the geolocation of an emitter, using at least one observer measuring signal change while moving on at least two observation tracks. The measurement of emitter signal change is begun between a first observer position and a second observer position. The second observer position is predicted at the time the last measurement from which signal change will be derived is made. The method utilizes knowledge of the measurement start and end points to determine a second pair of observer signal-change measurement start and end positions such that the emitter line-of-position (LOP) determined by the second signal change measurement will intersect the LOP associated with the first signal change measurement at possibly multiple points, but at each of these point intercept orthogonally to within the signal change measurement errors. The method determines the intersection points of the LOPs and assigns a likelihood to each intersection point for measuring the probability for each of the multiple intersection points that it is the emitter location, determines a correct emitter position from these likelihood weights, and generates an error associated with the emitter position estimate.

Advantageously, the method of this invention can be used with any means for generating the COP that produces those COP over a suitably short time interval. In particular, the COP can be unique and not a family such as those produces ab initio from ambiguous LBI phase measurements. Then the present invention assures that, without any advance knowledge of the emitter position, the two COP will intersect almost orthogonally at its location. But, most significantly, if the COP are generated from ambiguous LBI phase measurements, the present invention assures that when the ambiguity is resolved, the COP at the true emitter position will intersect nearly orthogonally since all members of the ambiguous sets of phase circles are orthogonal.

BRIEF DESCRIPTION OF THE DRAWINGS

The present invention is illustrated by way of example, and not by limitation, in the figures of the accompanying drawings, wherein elements having the same reference numeral designations represented like elements throughout and wherein:

FIG. 1 shows the basic phase circle geometry, and the relationship between ambiguous phase measurements and observation fixed points;

FIG. 2 illustrates the tactical formations military aircraft typically fly when locating hostile emitters;

FIG. 3 illustrates a prior art ideal emitter-observer geometry for TDOA when time measurement errors are the predominant system error;

FIG. 4a illustrates how aircraft flying the formations in FIG. 2 conventionally use the phase-circle geolocation method, and in particular indicates how the circles can intersect at a shallow angle magnifying the geometric dilution of precision;

FIG. 4b illustrates emitter geolocation error contours for the phase-circle location method with formation 201 in FIG. 2;

FIG. 5 illustrates how data for the two intersecting families of phase circles can be collected by aircraft flying different headings;

FIG. 6 illustrates the theoretical result that there is no exact solution to the problem posed in FIG. 5;

FIG. 7a provides an example of the optimal heading change for circle LOP emitter location when the observers are close, i.e., the tactical formations shown in FIG. 2, where the two families of circles intersect orthogonally (to within the bearing spread measurement errors), independent of the emitter's location;

FIG. 7b illustrates the emitter geolocation error contours when the optimal data collection geometry of FIG. 7a is used;

FIG. 7c indicates the optimum choice of α in FIG. 5 is 90°, and that this value results in circular error ellipse and contours of constant location error that are circles with center at the observers;

FIG. 8 illustrates how the transition between the formations shown in FIG. 2 is used to implement the optimal data collection geometry shown in FIG. 7a;

FIG. 9a shows the process flow required to implement the method of this invention, and the inputs required for the preferred implementation;

FIG. 9b illustrates that additional inputs may be required if the processes in FIG. 9a cannot be implemented in the preferred way; and FIG. 10 is a block diagram of the preferred implementation of the invention.

BEST MODE FOR CARRYING OUT THE INVENTION

FIG. 2 illustrates desirable engagement geometries for multi-platform emitter location in which the observers in two aircraft approach an emitter. These defensive formations involve aircraft pairs maintaining visual contact with one another and maximizing either self-defense or maneuverability, and are not consistent with the geometry required for optimal Time Difference of Arrival (TDOA), or current Circle-of-Position (COP), and COP-TDOA implementations. The aircraft are spaced close enough to allow visual contact, which is operationally highly desirable. In the past it has not proven feasible to employ such close spacings when using phase circles. Still, phase circles have an advantage over other multi-platform methods such as TDOA (described by Wegner in "On the Accuracy Analysis of Airborne Techniques for Passively Locating Electromagnetic Emitters", RAND Report R-722-PR, 1971). Conventional implementations of TDOA require three observers to almost simultaneously detect the emitter. Also an optimal implementation of TDOA reduces geometric dilution of precision, or GDOP, arising from shallowness of the angles at which the TDOA-generated lines-of-position (hyperbola) intersect at the emitter, by having the emitter and aircraft possess some unique special geometric relation. When signal measurement errors dominate observer navigation errors, Wegner shows this relationship to be that the three angles 301 between the three observer-to-emitter range vectors 300 (FIG. 3) are each 120°. Thus in optimal TDOA scenarios the aircraft are typically widely separated, with the emitter near the center of the observer triangle, and therefore the optimal TDOA scenario does not support the operational spacing shown in FIG. 2.

Although phase circles provide a solution for the flight of two aircraft, the impact of GDOP makes the solution, as conventionally implemented, far from optimal. FIG. 4a and 4b illustrate conventional COP emitter locations for aircraft in formation 201, but with a five mile spacing, not the desirable one-mile spacing shown. The circles for each observer are generated according to the second, unambiguous interpretation of FIG. 1. This results in the families of circles shown in FIG. 4a. Each COP intercept represents an emitter position. Inserts 401 and 405 illustrate in detail the interaction between measurement errors and emitter location errors for the particular case of an emitter at positions 400 and 406 respectively. The measurement errors cause the COP to be perturbed by the distance between lines 402. Because of the shallowness of the intersection of the circles at position 406, a small perturbation produces large geolocation errors 404. This effect is minimized by the intersection 403 when the COP intercepts at nearly right angles, as occurs at position 400. But as FIG. 4a illustrates, the COP generated by the two observers almost nowhere has this normal intersection property. At each COP intersection the interaction between GDOP and measurement error can be computed to give the Circular Error Probable, or CEP for the location accuracy. The CEP is the probability that, in a sequence of repeated location trials, fifty percent of the location estimates fall within a certain distance from the emitter. Relative emitter positions having the same CEP can then be linked to form contour lines. The result of this linking is illustrated in FIG. 4b. The CEP distance 408, is the 0.7 km error radius associated with the contour. This figure illustrates how strongly dependent performance is on the emitter bearing relative to the observers' flight path. In particular, in region 407, which lies along the flight path, the emitter is not located to any usable accuracy. Such a performance null, lying on the flight path, is an especially distressing failing of the COP approach. Geometric dilution of precision makes these contours very irregular and has an especially severe impact fore and aft of the long term observer tracks.

One approach to improving this COP performance is given in the applicant's U.S. Pat. No. 5,914,687, entitled "Combined Phase-Circle and Multi-platform TDOA Precision Emitter Location". The '687 patent describes a method for combining a single TDOA measurement with the phase circles to reduce the severity of the GDOP, but this reduction is still not generally optimal. Thus, unlike the approach shown in FIG. 4a, the present invention provides a method by which the second family of COP intercepts the first set everywhere at nearly a right angle. FIG. 5 indicates the basic idea: generate this second family of LOP by changing the data collection path 500 for the second observer. This concept leads to the question: is there a single best angle α501 that reduces the geometric dilution of precision everywhere?

It is not immediately obvious from purely theoretical considerations that such an angle exists, or even that such an approach is possible. Theoretically the problem of obtaining the second family of circles normally intercepting the first set may be solved by the "method of orthogonal trajectories", an application of first order ordinary differential equations (see, for example Louis Brand, Differential and Difference Equations, John Wiley and Sons, New York, 1966). The solution is illustrated in FIG. 6 when the initial family 600 is that 102 shown in FIG. 1, i.e., it has two "fixed points", points $m_1$ and $m_2$, through which every circle in the first set passes. The second family orthogonal to the first set is found to be the circles 601. Thus this solution shows that the objectives cannot be met rigorously. That is, each individual member of the orthogonal family of circles 601 does not pass through a common pair of points. Hence no fixed points, the start and end points of the second differential bearing measurement set, exist. In fact, unlike the first family of circles, the second family of circles forms a coaxial but non-intersecting set. The consequence of this nonexistence of fixed points is that, rigorously, the requirement for right angle intercept can only be met if the approximate emitter location 602 is known, so that the correct circle 603 and hence possible second observer start and end points $\mu_1$ and $\mu_2$ can be deduced. Then the path 500 (FIG. 5) passes through these points and the angle 501 changes with each change in emitter position. Thus, rigorously, only a solution with the drawback of requiring a priori emitter location information, analogous to the requirement for optimal TDOA, is available.

This solution, requiring flight through two specific points whose location depends on having prior knowledge of the approximate emitter position, may be important in certain special cases, but in general, for tactical aircraft approaching mobile emitter sites, it is not very useful. As noted in the Formation Phase Manual, Department of the Air Force, Headquarters Tactical Air Command, January 1977: "Tactical formations must possess the capability of maneuverability, mutual support, cruise control, and ease of management while still maintaining a high degree of offensive potential with the capability to become defensive, if the situation demands. The purest form of defensive formation occurs when all units fly line abreast . . . but maneuverability and ease of control are reduced. In-trail formation is best for pure maneuverability but flight coverage is minimal. It is obvious that we must effect a compromise. . . . " Thus tactical aircraft typically fly in the two formations shown in FIG. 2, trail formation ( 200 FIG. 2) and line abreast ( 201 FIG. 2). When approaching ground radar installations they will transition between these two formations as appropriate, but there is absolutely no guarantee the formations or transitions will result in flying through the two distinct sets of points ($m_1$, $m_2$) and ($\mu_1$, $\mu_2$) shown in FIG. 6.

These objects are met by making measurements such that, as closely as possible, the measurement end points ($m_1$, $m_2$) and ($\mu_1$, $\mu_2$) lie on the perpendicular bisector of the line joining the start and finish positions of the first set. This measurement geometry is implemented in practice by either a second aircraft 700 altering it's flight path normal to the first 701, or a single observer turning to obtain a second data collection set. FIG. 8 illustrates how the measurement geometry is achieved using transitions between the tactical formations shown in FIG. 2. Such transitions are common when detecting radar emitters. But this geometry, which need only be approximated, is easily implemented in any number of other ways.

When the data collection geometry approximates that of FIG. 7a two nearly orthogonal families of circles are generated, as shown in FIG. 7c. These circles were generated with aircraft flying an average one mile apart. The insert 704 shows the tracks flown to generate these phase circles. Observer 705 generated family 703; observer 706 generated COPs 702. The circles intersect at right angles with a precision consistent with the phase measurement error. Therefore, the qualifier "nearly" will be dropped when describing the orthogonal COP intercepts. This orthogonal intersection, to within the measurement error of the angle difference used to generate the COP, is typical of the results obtained when utilizing the ideal generic data collection geometry of FIG. 7a, which requires no prior knowledge whatsoever of the emitter location, or special data collection geometries such as that shown in FIG. 6. The data collection geometry in FIG. 6, which is also an outcome the method of this invention, requires prior approximate knowledge of the emitter position and hence is not the most desirable implementation.

To understand why this normal-intercept performance is obtained for the preferred data collection geometry shown in FIG. 7a, despite the theoretical fact that no fixed points exist for the second coaxial set of circles orthogonal to the first set through the fixed points ($m_1$, $m_2$), refer again to FIG. 6. In that Figure, when $m_1$ approaches $m_2$, the members of the set 601 get forced closer and closer to having the y-axis as a common tangent, and the set 600 gets forced closer and closer to having the x-axis as their common tangent. In the limit the fixed points for both families are (0,0) and the circles theoretically intersect everywhere orthogonally. This invention utilizes the fact that when measurement errors are present, the performance obtained with the data collection geometry shown in FIG. 7a cannot be distinguished from the ideal limiting case. In particular it also exploits the fact that because of emitter ECM only short data collection times are feasible, and hence the points ($m_1$, $m_2$) and ($\mu_1$, $\mu_2$) in FIG. 7a both lie close to (0,0) for the actual implementation results illustrated in FIG. 7c. When aircraft are approaching ground-based radar, a common electronic counter measure the radar uses is to limit its transmitter on time. Also in generating the second set of phase circles the second data collection track must be consistent with the emitter engagement requirements for tactical aircraft.

FIG. 7b shows the performance resulting from the data collection geometry in FIG. 7a. This performance is based on a detailed system model implementing the Cramer-Rao bound (William A. Gardner, "Likelihood Sensitivity and the Cramer-Rao Bound", IEEE Transactions on Information Theory, IT-5, No. 4, July 1979, p. 491) for estimating the emitter geolocation from the intersecting COP. The Cramer-RAO bound is a widely used method for assessing location estimation performance as a function of intrinsic system errors, but independent of any particular hardware and software installation. The observers are aircraft flying at 420 knots, with a data collection interval of 10 seconds. The phase measurement error was 8°, with a 240" LBI baseline. The observers flew the tracks shown in FIG. 8 (both transitions give identical results). The contours 707 of constant location error are nearly circular, with the center near the observers 708. The error thus depends only on emitter range from the observers, and is essentially independent of the initial relative bearing of the emitter. This result should be contrasted with that shown in FIG. 4b. In particular, note that the CEP contour associated with error radius 714 of 0.5 km extends uniformly about the observers, independent of the emitter angular position, for a constant emitter distance of about 150 nm from the observers. This performance is in marked contrast to that shown by contour 408 in FIG. 4b. Contour 408 requires the emitter to be as close 20 nm to the observers in order to achieve 0.5 km CEP performance. For the optimum data collection results in FIG. 7b, the circular nature of the contours of constant error breaks down 709 close to the observers. This degradation arises from the fact the data collection geometry is only an approximation, and that a strictly rigorous solution cannot be implemented. But this area is not a region in which precision location exhibiting the ideal symmetry in performance is commonly required, being typically within visual range.

But, the alternative unambiguous-family-of-circles-through-every-possible-emitter-position interpretation is important in understanding the generation of the performance results shown in FIG. 3b and FIG. 7b. The key feature of the invention this performance interpretation highlights in these two Figures is that optimal performance, independent of the ambiguity resolution process, is also independent of emitter relative bearing and range.

FIG. 7c illustrates the reason for symmetric and uniform nature of the location errors when the data collection method shown in FIG. 7a is used. The error ellipse 710 at any possible emitter site is nearly circular. This is a consequence of the orthogonal nature of the COP intercepts. The error in the individual COP due to the measurement error in the angle difference is given by Clark, op. cit.)

$$\sigma_\perp = \frac{r_1 r_2}{D} \sigma_{\Delta a} \quad (1)$$

where $r_1$=range to the emitter from point i,

D=distance between angle difference measurement start and end points, $\sigma_{\Delta a}$=angle difference measurement error sigma.

Since the observers are closely spaced they are at about the same range from the emitter. Hence, their COPs have about the same error, and since the errors 711 are in a direction normal to their respective COP the circular error ellipse 712 (or equivalently 710 and 713) results. From Equation (1) the radius 715 of each of these error ellipses is, for the approximate average range from both observers r, $$\varepsilon_i = \frac{r^2}{D} \sigma_{\Delta a} \quad (2)$$

Thus the error ellipses are nearly circles, as shown. This has a further performance consequence, shown by the contour lines (707 FIG. 7b and FIG. 7c) connecting error ellipse 713 (FIG. 7c) having equal radii 715. These contour lines are also nearly circles, centered at the intersection of the data collection paths, and thus indicate performance in FIG. 7b independent of relative emitter bearing, in stark contrast to the performance shown in FIG. 4b.

Intrinsic to the invention is thus the generation of circles-of-position each of whose error is closely approximated by Equation (2). Thus the symmetry in performance shown in FIG. 7b, which is also an intrinsic part of this invention ultimately results from associating COP with very small angle change measurements made by very closely spaced observers. The preferred manner in which this association can be accomplished in practice in order to satisfy the objectives is described next.

FIG. 9a indicates two basic inputs required to accomplish the objectives of this invention. These inputs are the position 900 at which bearing change measurements began, and the predicted collection time interval 901. With these two inputs the final data collection point 902 for the first observer can be predicted, i.e., the initial observer "fixed points", and thus the second observer fixed start-end point pair for the orthogonal COP insert 903 determined.

FIG. 9b provides an example illustrating that additional inputs (beyond points 901–903) are needed if the observers are not closely spaced. These additional inputs require additional time and hardware to generate, and hence are undesirable. The need for these inputs is discussed in more detail as the preferred implementation shown in FIG. 9a is described next.

If the observers are closely spaced, e.g., in one of the tactical formations shown in FIG. 2, then process 903 generates a transition between tactical formations, as shown in FIG. 8. An intrinsic aspect of this transition is that at the end of the data collection cycle the observers can be flying the initial heading again in relative positions supporting enhanced maneuverability or enhanced defense. But an important overall aspect of process 903 is that it can also determine observer fixed points such as 604 (FIG. 6) when the observers are not closely spaced. Determining fixed points when the observers are not closely spaced requires approximate emitter location (907 FIG. 9b) as an input on a par with positions 900 and 901, and guarantees orthogonal COP intercept only at that one emitter location. Therefore the use of closely spaced observers transitioning between tactical formations is the preferred implementation of process 903. The bearing change measurements in process 904 can be made by either measuring relative angles to the emitter at the first and second fixed point, then deducing the bearing change from these measurements, or, since relative emitter bearing is never used alone, by directly measuring the bearing change itself. Since angle resolution in contrast to angle accuracy is required, directly measuring the angle change is the preferred method. Measuring angle change has the advantage that constant bias errors typically corrupting angle measurements cancel out. The circles-of-position are then generated 905 from the bearing change 904 associated with the fixed points. Process 904 generally results in a unique bearing change, but after the association of bearing change with COP, the intersection of COP to locate the emitter gives an ambiguous result since the circles-of-position intersect in two points. Process 906 determines which of the intercepts is the emitter. If the observers are closely spaced so that the preferred implementation of process 903 is feasible, then this determination is trivial since the second intercept occurs near the observers. If the observers are farther apart, but with special geometry, such as that demonstrated by tracks 604 and 605, then the second intersection will still occur at one of the observers, and process 906 can determine the correct intersection with special logic testing for this case. Process 903 always attempts to determine the second observer fixed points such that this geometry obtains. If this solution is not feasible, then process 906 requires additional measurements to break the ambiguity. These measurements can take many forms, e.g., amplitude or phase direction finding, or a TDOA (908

FIG. 9b) based derivation of the signal angle of arrival. But as noted, to avoid the need for these additional inputs, on a par with 900 and 901, the preferred method of implementation is for process 903 to provide 906 with a COP geometry assuring near first or second observer COP intersections. And as also noted, such geometry is shown in FIG. 6. Track 604 fixed points $\mu_1$ and $\mu_2$ assure COP 603 and COP 605, intersect at point 606. This point is easily eliminated since it is close to both observers, and the true emitter position 602 chosen.

From the above description of the process flow it is clear that processes 903 and 904 are important to the invention. In particular process 904 provides the ability to generate accurate COP from angle change measurements made over a short time interval, and hence is the key to ensuring that the performance closely approximates Equation 2. The preferred means for implementing this process is the LBI phase circle technique disclosed in the applicant's U.S. Pat. No. 5,526,001, which is hereby incorporated by reference in its entirety into this specification. Either resolved or unresolved LBI phase difference measurements can be used. If families of phase circles are generated from ambiguous phase measurements, the intersection corresponding to the true emitter location can be found by combining process 904 and process 905 using the method of the applicant's U.S. Pat. No. 5,914,687 "Combined Circle-of-Position and Multi-platform TDOA Precision Emitter Location". As another alternative an unique circle-of-position can be produced from a resolved LBI phase difference, where the method to accomplish the ambiguity resolution is that given in U.S. Pat. No. 4,734,702.

But both these approaches require hardware additional to that needed to generate the phase circles. Therefore the preferred method to implement this invention is to resolve the LBI phase ambiguities using the technique described in the applicant's U.S. Pat. No. 5,343,212. This approach does not require additional hardware to resolve the ambiguities, but instead employs software test based upon the observer's motion. The ambiguity resolution could occur before or after the phase circles are generated. Both implementations are described next.

Referring to FIG. 10, modules 1000 and 1001 are the LBI phase measurement subsystems carried by observers 1 and 2 respectively. Observer 1 is the observer initially detecting the emitter. Observer 2 is queued by this initial detection via a communication link 1002, and acquires the emitter with an RF frequency-tuning controller 1003. An important aspect of this invention is that the bandwidth requirements for the COMM link are very modest, and, in fact, no more than normally available for voice communications. The tune control is also readily implemented by inserting the pulse data record (PDR) 1004 from observer 1 into the active emitter file (AEF) 1005 of observer 2, and hence requires very little modification to single-observer detection and ranging software. This insertion triggers a request 1006 from a phase collection controller 1007 to a track predictor 1008 requesting a heading change 1009. Based on navigation data 1010 provided by the first observer through the COMM link 1002, the track predictor 108 computes the heading change needed to closely approximate the data collection track shown in FIG. 7a. The NAV processor 1011 determines when this new track is being flown, and a begin data collection signal 1012 sent from the phase collection controller 1007 commands the tune controller to begin data collection.

The ambiguous phase measurements 1013 made by observer 1 and by observer 2 contain bias errors 1014 and thermal noise errors 1015. The phase measurements are received by the phase by determinator 1013 from receivers 1040, 1041 which are tuned by a tune controller 1042. These measured phases from one observer are used to locate the emitter, typically to a range accuracy of between 10% and 5%, while simultaneously resolving the phase difference integer ambiguity, where the phase difference is taken between the pulses measured in the first receiver dwell and pulses measured in the last dwell. As noted, the preferred method for doing this single-observer location is that described in the applicant's U.S. Pat. No. 5,343,212. The emitter's coarse location 1016 is forwarded to resolve phase difference 1017 and the resolved phase differences $\Delta\phi 1$ and $\Delta\phi 2$ are sent to a central computing site 1018. This can be located anywhere, but is typically a processor on observer 1. The observer 2 stored ambiguous phases 1019 and NAV data 1020 associated with these measurements are uplinked via signal 1021 to the central processor from a NAV module 1030 and a phase determinator module 1031, respectively. This uplinking can use the same COMM channel 1002 observer 2 was originally queued by since only ten to twenty PDRs are typically sent. The phase difference ambiguity in the observer 2 data is resolved 1017 by predicting the ambiguity integer using the coarse emitter location previously found and observer 2 LBI spatial position obtained from the NAV data 1020 and 1022. The resolved phases are then used by the central processor 1018 to generate COP, and an estimate of the orthogonal point of intersection of the COP closest to the coarse emitter position found using optimal estimation algorithms, typically a maximum likelihood estimator. The intersection of the COP will be orthogonal no matter where the emitter is located based on the data collection path flown as determined by the track predictor 1008. The track of observer 2 is also established by this process so that the COP intersection furthest from the observers is the emitter location, and hence requires no auxiliary measurements or processing to choose.

As noted it is possible to use the ambiguous phase to generate a family of phase circles before resolving the phase ambiguity. This may be done if TDOA measurements are available to do the ambiguity resolution as described in the applicant's U.S. Pat. No. 5,914,687. It may also happen that too few phase measurements are available from observer 1 and observer 2 to accomplish individual location. Then the phase measurements 1019 and 1023 may be combined, as though they came from a single observer, to do the coarse emitter location 1016. Furthermore, all aspects of this invention can be implemented by a single, rather than multiple, observer. If a single observer is used, the time to locate the emitter will be greater, and hence the approach is vulnerable to radar ECM. But aside from this, one observer sequentially flying through the required fixed points can realize all data collection geometries.

Advantageously, the present invention does not require a second independent measurement, such as TDOA; also the current invention always minimizes degradation due to geometric dilution of precision to the maximum extent possible. Furthermore this new geolocation method allows the use of even closer observer spacing. Rather than introduce a new measurement, the present invention uses observer heading change during the phase measurement process to produce nearly orthogonally intersecting phase circles at the emitter. A significant aspect of the present invention is that, for operationally feasible maneuvers, unlike pure TDOA, no a priori knowledge of the emitter's location is required to guarantee this orthogonal intersection.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for determining the geolocation of an emitter, using at least one observer measuring signal change while moving on at least two observation tracks, the method comprising the steps of:

beginning the measurement of emitter signal change between a first observer position and a second observer position;

predicting the second observer position at a time the last measurement from which signal change will be derived is made;

utilizing knowledge of the measurement start and end points to determine a second pair of observer signal-change measurement start and end positions such that the emitter line-of-position (LOP) determined by the second signal change measurement will intersect the LOP associated with the first signal change measurement at possibly multiple points, but at each of these points intercept orthogonally to within the signal change measurement errors;

determining the intersection points of the LOPs;

assigning a likelihood to each intersection point for measuring the probability for each of the multiple intersection points that it is the emitter location;

determining a correct emitter position from these likelihood weights; and generating an error associated with the emitter position estimate.

2. The method of claim 1, wherein said beginning, said predicting and said utilizing steps are performed simultaneously.

3. The method of claim 1, wherein said determining the intersection point, said assigning, said determining the correct emitter position and said generating steps are performed following said utilizing step.

4. The method of claim 1, wherein the signal change measured is the change in wavefront normal to the emitter's signal at the bearing change angle sub-tended at the emitter and the LOP is the circle passing through the emitter and two signal change measurement points wherein a COP is a circle uniquely determined by the bearing change.

5. The method of claim 1, wherein the error in estimating the correct emitter location depends only on the range of the emitter from an intersection of the two observation tracks and not the initial relative bearing of the emitter to either of the tracks, and comprising:

generating a start and end point of the second data collection track such that the straight line connecting the start of the second track and the end of the second track measurement position is orthogonal to a line connecting the start of the first track and the end of the second track measurement positions; and determining the start time of the second observation track from predictions of observer position utilizing velocity and acceleration measurements such that the orthogonal intersection occurs at the midpoint of the first observation track.

6. The method of claim 4, wherein the error in estimating the correct emitter location depends only on the range of the emitter from an intersection of the two observation tracks and not the initial relative bearing of the emitter to either of the tracks, and comprising:

generating a start and end point of the second data collection track such that the straight line connecting the start of the second track and the end of the second track measurement position is orthogonal to a line connecting the start of the first track and the end of the second track measurement positions; and determining the start time of the second observation track from predictions of observer position utilizing velocity and acceleration measurements such that the orthogonal intersection occurs at the midpoint of the first observation track.

7. The method of claim 1, wherein the step of generating the estimation error comprises:

determining the range to the emitter from the intersection of the observation tracks utilizing the emitter position estimate found by a COP intersection;

generating the error in the emitter position estimate normal to the COP through the emitter associated with each observer by utilizing this range, the distance between the pair of observation points and the signal measurement error; and combining the determined range and the generated error to form an error ellipse having the property that its major and minor axis are nearly equal such that the error ellipse is a circle centered on the true emitter position and that the contours of equal location estimation error are coaxial circles centered on the track intersection.

8. The method of claim 4, wherein the step of generating the estimation error comprises:

determining the range to the emitter from the intersection of the observation tracks utilizing the emitter position estimate found by COP intersection;

generating the error in the emitter position estimate normal to the COP through the emitter associated with each observer by utilizing this range, the distance between the pair of observation points and the signal measurement error; and combining these two single error estimates to form an error ellipse having the property that its major and minor axis are nearly equal such that the error ellipse is a circle centered on the true emitter position and that the contours of equal location estimation error are coaxial circles centered on the track intersection.

9. The method of claim 5, wherein the step of generating the estimation error comprises:

determining the range to the emitter from the intersection of the observation tracks utilizing the emitter position estimate found by a COP intersection;

generating the error in the emitter position estimate normal to the COP through the emitter associated with each observer by utilizing this range, the distance between the pair of observation points and the signal measurement error; and combining these two single error estimates to form an error ellipse having the property that its major and minor axis are nearly equal such that the error ellipse is a circle centered on the true emitter position and that the contours of equal location estimation error are coaxial circles centered on the track intersection.

10. The method of claim 1, wherein the second pair of observation points is determined from approximate knowledge of the emitter's geolocation and the positions of the first two observation points such that a single unique circle that passes through the second two observation points intersects nearly orthogonally at the emitter, the first circle passing through the first two observation points, comprising:

generating a first COP from bearing change measurements;

predicting the COP passing through the approximate emitter location, orthogonal to the first COP;

determining start and end bearing measurement positions on the predicted COP;

measuring the bearing change between these positions;

forming a second COP from these bearing change measurements; and intersecting the first and second COP to obtain precision emitter location.

11. The method of claim 4, wherein the second pair of observation points is determined from approximate knowledge of the emitter's geolocation and the positions of the first two observation points such that a single unique circle that passes through the second two observation points intersects nearly orthogonally at the emitter, the first circle passing through the first two observation points, comprising:

generating a first COP from bearing change measurements;

predicting the COP passing through the approximate emitter location, orthogonal to the first COP;

determining start and end bearing measurement positions on the predicted COP;

measuring the bearing change between these positions;

forming a second COP from these bearing change measurements; and intersecting the first and second COP to obtain precision emitter location.

12. The method of claim 1, wherein the observation points lie on tracks flown in transition between tactical formations.

13. The method of claim 4, wherein the observation points lie on tracks flown in transition between tactical formations.

14. The method of claim 5, wherein the observation points lie on tracks flown in transition between tactical formations.

15. The method of claim 7, wherein the observation points lie on tracks flown in transition between tactical formations.

16. The method of claim 1, wherein the step of assigning likelihood values to the intersection points comprises:

assigning a likelihood of 1 to a further intersection from the observers.

17. The method of claim 4, wherein the step of assigning likelihood values to the intersection points comprises:

assigning a likelihood of 1 to a further intersection from the observers.

18. The method of claim 5, wherein the step of assigning likelihood values to the intersection points comprises:

assigning a likelihood of 1 to a further intersection from the observers.

19. The method of claim 7, wherein the step of assigning likelihood values to the intersection points comprises:

assigning a likelihood of 1 to the further intersection from the observers.

20. The method of claim 1, wherein the step of assigning likelihood values to the intersection points comprises:

determining a second observation track such that the circle through the emitter and first pair of measurement positions and the circle through the emitter and the second pair of measurement points intercept in a second location near one of the observers, the emitter being at the further intersection from the observers with a likelihood of 1.

21. The method of claim 5, wherein the step of assigning likelihood values to the intersection points comprises:

determining a second observation track such that the circle through the emitter and first pair of measurement positions and the circle through the emitter and the second pair of measurement points intercept in a second location near one of the observers, the emitter being at the further intersection from the observers with a likelihood of 1.

22. The method of claim 7, wherein the step of assigning likelihood values to the intersection points comprises:

determining a second observation track such that the circle through the emitter and first pair of measurement positions and the circle through the emitter and the second pair of measurement points intercept in a second location near one of the observers, the emitter being at the further intersection from the observers with a likelihood of 1.

23. The method of claim 10, wherein the step of assigning likelihood values to the intersection points comprises:

determining a second observation track such that the circle through the emitter and first pair of measurement positions and the circle through the emitter and the second pair of measurement points intercept in a second location near one of the observers, the emitter being at the further intersection from the observers with a likelihood of 1.

24. The method of claim 1, wherein a bearing change is determined by measuring interferometer phase change between the observation points.

25. The method of claim 4, wherein the bearing change is determined by measuring interferometer phase change between the observation points.

26. The method of claim 1, wherein an interferometer is an ambiguous uncalibrated long baseline interferometer (LBI) with the step of:

determining COP through the initial and final observation points creating not a single unique circle but a family of phase circles representing all possible resolutions of the ambiguous LBI phase difference, where the ambiguous phase difference is measured between the initial and final observation points and only one circle in the family passes through the emitter position.

27. The method of claim 1, further comprising:

making multiple LBI phase change measurements between the initial and final measurement positions for each observer;

utilizing these multiple phase change measurements to generate two families of COP through the two pairs of initial and final measurement positions, each circle in these families corresponding to a possible ambiguity integer resolving the ambiguous LBI phase change measurement made between the measurement positions;

measuring emitter signal TDOA between the two observers;

resolving the integer ambiguities by determining the TDOA intersection statistically closest to the circle of position intersection;

determining the intercept point closest to the emitter by determining the farthest intersection point from the observer for the two resulting unambiguous circles.

28. The method of claim 26, comprising making multiple LBI phase change measurements between the initial and final measurement positions at both observers, utilizing these multiple phase change measurements to approximately locate the emitter relative to a single observer, thus resolving the phase change module $2\pi$ ambiguity for the phase change measurements made at each observer, associating the unique COPs with the resolved phase differences to get the unique emitter geolocation.

* * * * *